United States Patent [19]

Flöther

[11] 4,081,812
[45] Mar. 28, 1978

[54] PHOTOGRAPHIC LENS WITH PERSPECTIVE-ADJUSTMENT FEATURE

[75] Inventor: Werner Flöther, Oberkochen, Germany

[73] Assignee: Carl Zeiss-Stiftung, Oberkochen, Germany

[21] Appl. No.: 776,179

[22] Filed: Mar. 10, 1977

[30] Foreign Application Priority Data

Mar. 27, 1976 Germany .............................. 2613159

[51] Int. Cl.² .......................... G03B 5/06; G02B 7/02; G03B 7/08
[52] U.S. Cl. .................................. 354/286; 350/247; 354/38
[58] Field of Search ............... 354/202, 286, 152, 155, 354/26, 30, 38, 60, 289, 232, 286, 270-273; 350/206, 247

[56] References Cited

U.S. PATENT DOCUMENTS

| | | | |
|---|---|---|---|
| 2,931,268 | 4/1960 | Gelb | 354/270 |
| 3,270,640 | 9/1966 | Hofmann et al. | 354/38 |
| 3,623,415 | 11/1971 | Atzmüller | 354/202 |
| 3,704,658 | 12/1972 | Uesugi | 350/247 X |
| 3,713,725 | 1/1973 | Uesugi | 350/247 |

FOREIGN PATENT DOCUMENTS

203,850 11/1958 Austria .............................. 354/202

*Primary Examiner*—Donald A. Griffin
*Attorney, Agent, or Firm*—Hopgood, Calimafde, Kalil, Blaustein & Lieberman

[57] ABSTRACT

The invention provides a perspective-correction lens with an automatic-diaphragm feature which permits through-the-lens viewing at full brilliance, while also permitting the diaphragm to be set in accordance with photo-electric exposure measurements performed at the body of the camera to which the lens is mounted. Such automatic-diaphragm operation is correctly performed, regardless of the extent or direction of eccentric-offset adjustment of the lens with respect to the camera axis.

5 Claims, 7 Drawing Figures

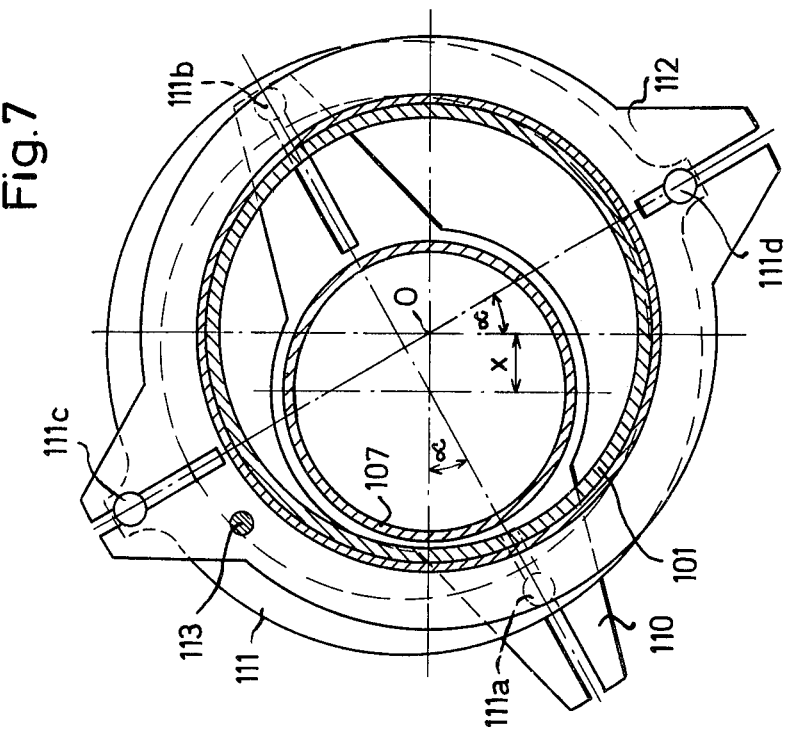
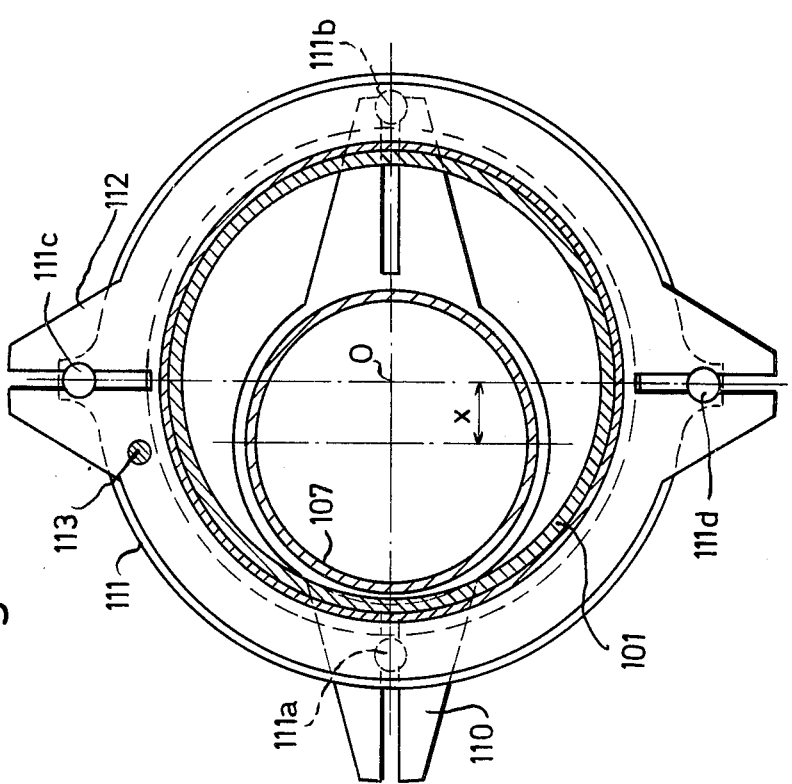

PHOTOGRAPHIC LENS WITH PERSPECTIVE-ADJUSTMENT FEATURE

The present invention relates to a photographic lens with the possibility of adjustment for correction of perspective.

Lenses with possibility of adjustment for the correction of perspective, hereinafter referred to as PC lenses, are used to counteract distortions in perspective such as converging verticals in architectural photographs, etc.

PC lenses are already known which can be displaced vertically, horizontally, and diagonally on the camera and which are used to correct the perspective upon the taking of pictures, particularly in architectural and industrial photography.

Existing PC lenses have the disadvantage that they are not equipped with automatic instant-return diaphragms, and therefore such diaphragms must be set manually.

The object of the present invention is to provide a PC lens with automatic-diaphragm control.

The purpose is achieved, in accordance with the invention, by providing a swing-angle transmission system which consists of a drive part, a transmission part, and a diaphragm controlled part, the drive part being arranged concentrically to the camera, and the diaphragm-controlled part being arranged concentrically to the axis of the lens, while the transmission part connects the two of them.

In one advantageous embodiment of the invention, additional adjustment rings are provided for selective displacement of the lens in the x-y coordinates.

The advantages obtained by the invention reside in the fact that a PC lens with automatic diaphragm control has been created for the first time.

One embodiment is shown, by way of example, in the drawing and will be described in further detail below. In the drawing:

FIG. 6 is a view similar to FIG. 4, for the situation in which the lens has been horizontally shifted to an offset position with respect to the camera axis, without rotation of the diaphragm-controlled part; and FIG. 7 is a view similar to FIG. 6, for the situation in which the diaphragm-controlled part has been rotated through a displacement angle $\alpha$.

Figure 1:
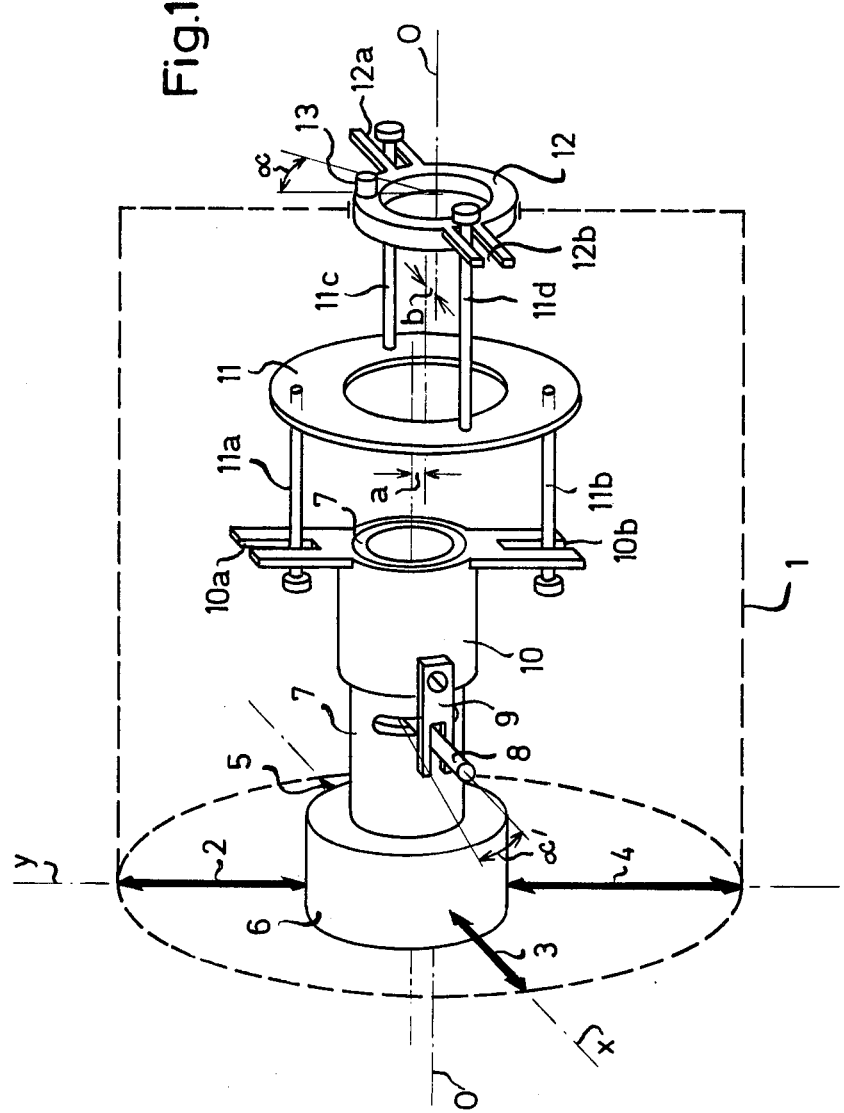
FIG. 1 is a simplified diagram of an arrangement in accordance with the invention, seen in perspective.

In the simplified diagram of FIG. 1, the dashed line 1 schematically indicates the outer contour of the lens housing. The double arrows 2-3-4-5 represent mechanical setting means for displacing a lens, including its mount 6, in x-y coordinates. In FIG. 1, the horizontal and vertical components of possible eccentricities of the axis of the lens with respect to the axis of the camera are designated x and y, and the setting means 2-3-4-5 are explained in further detail in FIGS. 2 and 3. An iris-diaphragm mount 7 is carried with the lens mount 6, and a diaphragm-control pin 8 extends out of the diaphragm mount 7. By displacing pin 8 through the angle $\alpha$ the diaphragm aperture can be changed in known manner. Pin 8 is continuously engaged by a fork 9 fastened to a sleeve part 10. Part 10 is rotatable on the diaphragm mount 7, with the diaphragm mount 7 providing radial and axial guide coaction with part 10.

Part 10 is the diaphragm-controlled part of the angle-of-swing transmission system of the invention. The transmission system is in the form of a flexible coupling, comprising a transmission part 11 and a drive part 12, the latter being arranged concentric to the camera axis. The transmission of the rotary displacement for actuating the iris diaphragm, whether or not the lens and diaphragm mounts 6-7 are shifted in the x or y direction, is effected by means of the transmission part 11. For this purpose, the transmission part is provided with four support members arranged 90° apart, which are schematically shown in FIG. 1 as disproportionally long bolts 11a-11b-11c-11d. Of these members, bolts 11a-11b are guided in diametrically opposed guide slots 10a-10b of sleeve part 10; and, in quadrature relation therewith, bolts 11c-11d are guided in diametrically opposed guide slots 12a-12b of the drive part 12. In order to actuate the diaphragm (or to track the instantaneous setting of the diaphragm), the drive part 12, which is journalled for rotation concentric to the camera axis O, is rotated via a pin 13 through a desired angle $\alpha$, it being understood that pin 13 cooperates with known means (not shown) for the control of the diaphragm. The eccentricity of the lens mount 6 with respect to the camera axis is neutralized by the angle-of-swing transmission system 10-11-12, so that the swing angle $\alpha$ is faithfully transmitted to the pin 8, thereby controlling the diaphragm aperture with the same angle-$\alpha$ displacement.

Figure 2:
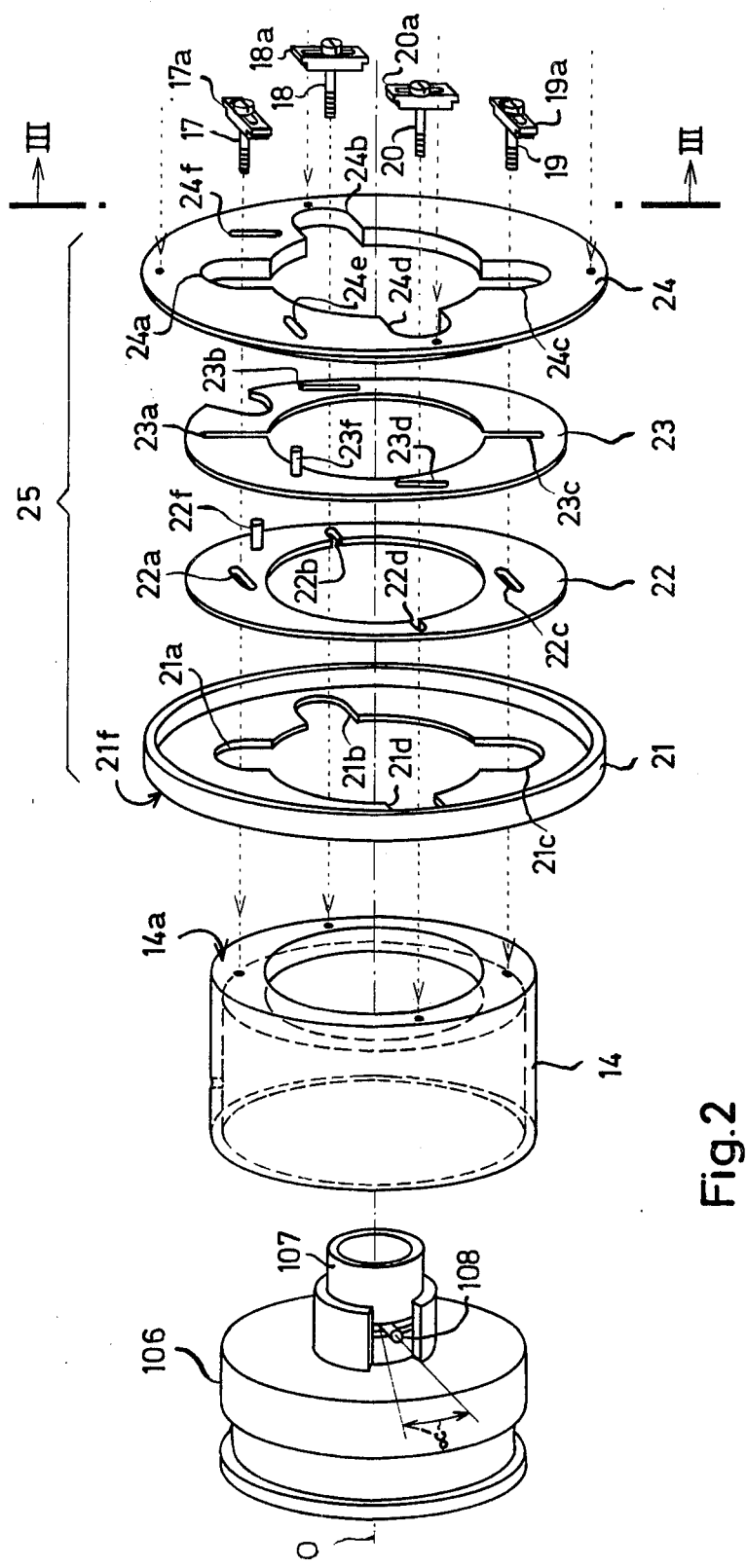
FIGS. 2 and 3 are the respective two parts of a single exploded view in perspective, of a preferred embodiment of the invention, the plane III—III of FIG. 2 being connected at the plane II—II of FIG. 3.
Figure 3:
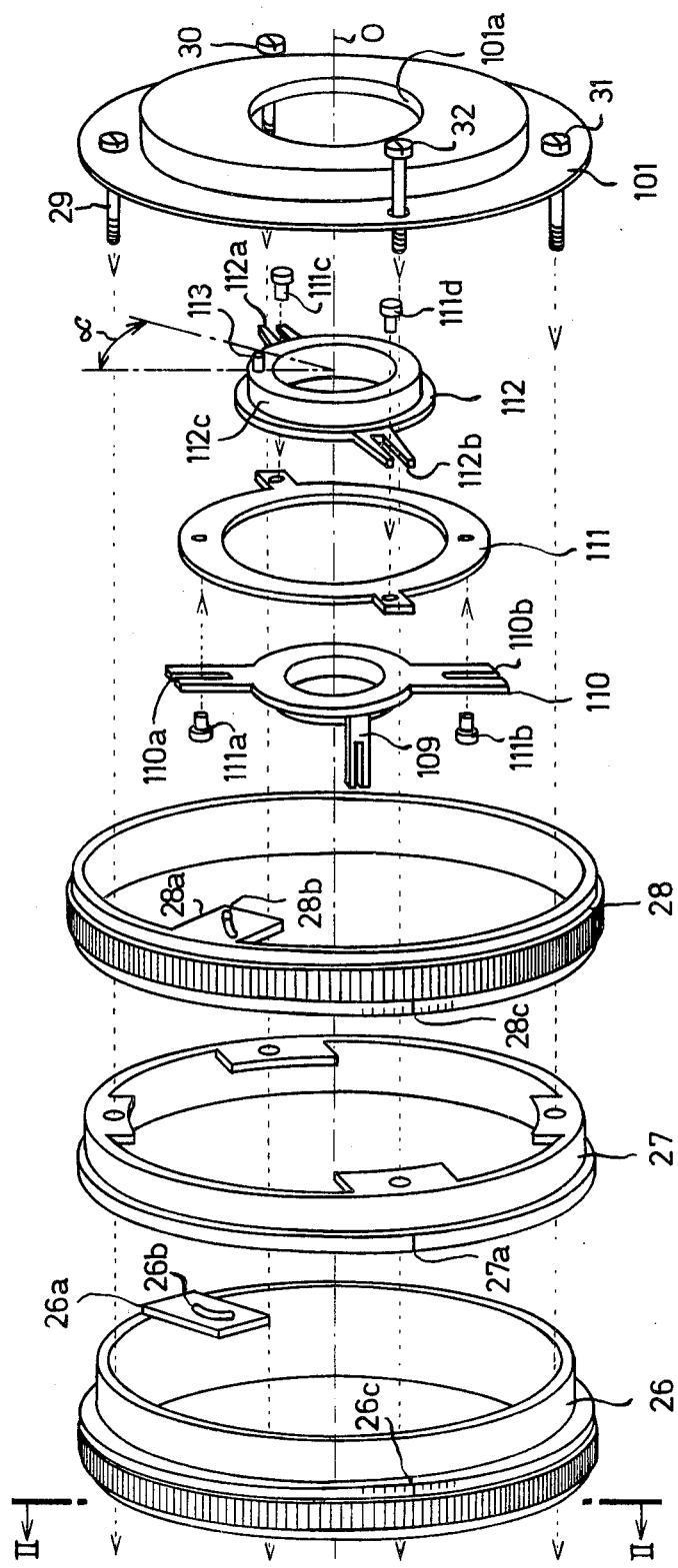

A specific embodiment of the invention is shown in FIGS. 2 and 3, the individual parts being shown in the axial sequence in which they are mounted. Parts which perform the same function as the parts shown schematically in FIG. 1 bear reference numbers which are greater by 100 than in FIG. 1. Thus 106 is the lens mount, 107 the diaphragm mount, and 108 the pin which controls the diaphragm aperture. The lens mount 106 is inserted, together with the diaphragm mount 107, in a schematically shown adjustment mount 14 which is fastened by bolts 17-18-19-20 to a system 25 of slotted ring or disc parts 21-22-23-24, the bolt 17 being inserted through slots 24a-23a-22a-21a, the bolt 18 through slots 24b-23b-22b-21b, the bolt 19 through slots 24c-23c-22c-21c, and the bolt 20 through the slots 24d-23d-22d-21d. After tightening the bolts 17-18-19-20, the flanged-end surface 14a of the adjusting mount 14 is eccentrically displaceable (in x-y directions) on the adjacent end surface of a disc 21, the latter being fixed with respect to the axis of the camera. For lens-focusing purposes, the lens mount 106 and the diaphragm mount 107 are simultaneously displaced. Upon such displacement, slotted washers 17a-18a-19a-20a of screws 17-18-19-20 slide in radial slots 24a-24b-24c-24d of part 24 which is also fixed with respect to the axis of the camera, the same being held by bolts 29-30-31-32 to the ring member 101 (FIG. 3) by which the entire assembly is mounted to the camera body (not shown).

The ring or disc parts 21-22-23-24 will be seen together to form a system 25 by which the lens mount 106, the diaphragm mount 107 and the adjustment mount 14 can be eccentrically displaced in the x-y coordinates relative to the camera axis O. Collectively, these parts 21-22-23-24 correspond generally to the setting means 2-3-4-5, shown schematically in FIG. 1; however, the end parts 21-24 are fitted to each other and define therebetween a zone in which the intermediate discs or setting rings 22-23 have limited freedom for sliding displacement, as dictated by pin and slot engagements to be described.

Eccentric displacement of the adjustment mount 14 in the x or y direction is controlled by displacement of the setting rings 22 and 23, in mutually perpendicular directions. This is accomplished, in the assembled condition of the system 25, by reason of a control pin 22*f* (on disc 22) extending through a slot 24*f* and a control pin 23*f* (on disc 23) extending through a slot 24*e*; slots 24*e* and 24*f* on end part 24 are straight, being horizontally and vertically oriented, respectively. Also, disc 22 is characterized by plural horizontal slots 22*a*-22*b*-22*c*-22*d* to limit disc 22 to horizontal displacement with respect to bolts 17-18-19-20, while disc 23 is characterized by plural vertical slots 23*a*-23*b*-23*c*-23*d* to limit disc 23 to vertical movement with respect to bolts 17-18-19-20. Upon movement of the control pin 22*f* in the vertical slot 24*f*, all four bolts 17-18-19-20 are correspondingly and positively displaced via their respective engagements to horizontal slots 22*a*-22*b*-22*c*-22*d*; the bolts 17-18-19-20 are secured to the adjustment mount 14, and therefore the mount 14 is also correspondingly displaced in the y-direction in response to vertical movement of pin 22*f*, the mount end surface 14*a* sliding on the adjacent end surface 21*f* of the part 21 which is fixed relative to the camera axis O. It will be understood that for such vertical displacement, the disc 23 remains at rest, since the bolts 17-18-19-20 are movable in the vertical slots 23*a*-23*b*-23*c*-23*d*. Horizontal movement (in the x-direction) of the adjustment mount 14 is effected in a manner similar to that described for vertical control via the control pin 22*f*; the horizontal control being via control pin 23*f*, slidable in the fixed horizontal slot 24*e*.

A selective control system for x and y directions is shown in FIG. 3 to comprise three rings 26-27-28. When assembled, rings 26-27-28 are concentrically telescoped, with axially adjacent exposed flanges. Ring 26 includes a lug 26*a* with a control cam slot 26*b* in which pin 22*f* is a follower, and ring 28 includes a similar lug 28*a* with a control cam slot 28*b* in which pin 23*f* is a follower; and the lugs 26*a*-28*a* lie in substantially the same plane. Ring 27 is fixed in space (via bolts 29-30-31-32) and is concentric to the camera axis, and it provides the rotational support for rings 26 and 28. Rings 26-27-28 are pushed in assembled condition over the system 24, with discs 21-24 deriving concentric support from the bore of ring 26, and with lugs 26*a* and 28*a* slidable on the end surface of disc 24, while follower pins 22*f* and 23*f* track their respective cam slots 26*b* and 28*b*. Upon selective rotation of ring 26, the disc 22 is vertically displaced (in the y-axis direction) by cam 26*b*, via pin 22*f*; upon selective rotation of ring 28, the disc 23 is similarly but horizontally displaced (in the x-axis direction) by cam 28*b*, via pin 23*f*. At the same time, such selective movement of rings 26 and 28 is transmitted by discs 22-23 via bolts 17-18-19-20 to the adjustment mount 14, and the lens is thus selectively displaced in either or both axes with respect to the camera axis.

In order to characterize this displacement, both the rings 26 and 28 are provided with scales (26*c*-28*c*) readable against a stationary index mark 27*a* on the fixed ring 27.

To complete the description of FIG. 3, parts 110-111-112 form the angle-of-swing transmission system of the invention and perform the same function as described for corresponding parts 10-11-12 in the simplified diagram of FIG. 1, the part 110 rotating on mount 107, and the fork 109 enabling part 110 to faithfully track the instantaneous swing angle of the diaphragm-control pin 108. Part 101 is the ring by which the described lens and control system is selectively mounted to a camera, part 101 being the base for retention of discs 24-27 (and, at the same time, disc 21 and rings 26-28) in constant concentric relation with the camera axis, relying on bolts 29-30-31-32 to hold this relationship, and part 112 being concentrically and rotatably positioned by insertion of its cylindrical outer surface 112*c* in the bore 101*a*.

Figure 5:
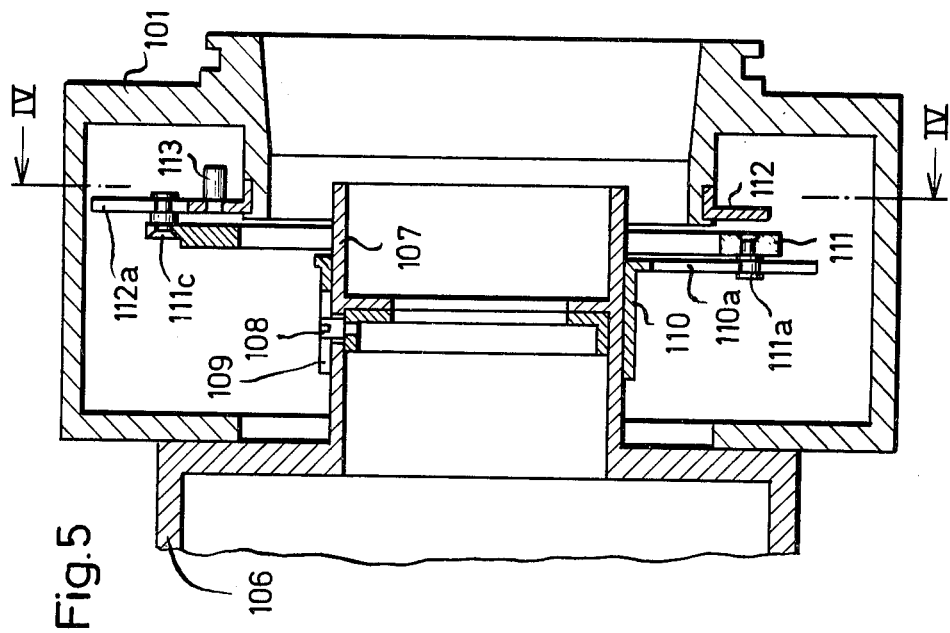
FIG. 5 is a section through the system shown in FIG. 5, the section being taken along the line V-V of FIG. 4.
Figure 4:
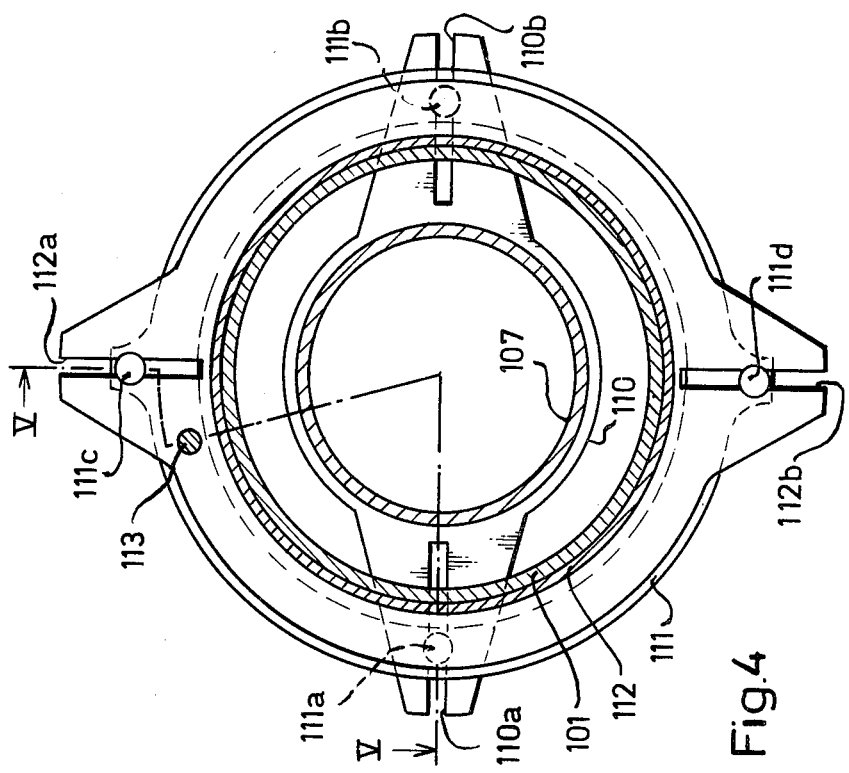
FIG. 4 is a sectional view to show the angle-of-swing transmission system of FIG. 3, for the situation in which the lens is positioned concentric to the camera axis, the section being taken at IV—IV of FIG. 5.

FIGS. 4 to 7 show an assembled angle-of-swing transmission system of the invention, with slight modification as compared with the angle-of-swing transmission system shown in FIG. 3, the x-y positioning mechanism of parts 25-26-27-28 being omitted for simplifying purposes; however, corresponding individual parts bear the same reference numbers as in FIGS. 2 and 3. In FIGS. 4 and 5, the lens mount 106 is arranged concentrically to the camera axis. In the showing of FIG. 6, the lens mount 106 has been shifted in the x-direction, while in FIG. 7 the lens mount 106 has been shifted in the x-direction and has been rotated by the angle a.

What is claimed is:

1. An automatic-diaphragm lens system, comprising a lens and mount therefor on the lens axis, said mount including an automatic diaphragm including an angularly displaceable element tracking the diaphragm setting, adapter means for connecting said lens mount to a camera body on the mounting axis thereof, said adapter means including selectively operable means for adjusting the eccentric offset of said lens mount with respect to the camera-mounting axis thereof, and angle-transmitting means for transmitting the instantaneous angular position of said displaceable element to the camera-mounting end of said adapter means, said angle-transmitting means comprising a first ring member having a follower connection to said displaceable element and journalled for rotation on the lens-mount axis, a second ring member journalled for rotation on the camera-mounting axis and including an angularly displaceable element for control connection to a movable camera-body part, an intermediate floating-ring member interposed between said first and second ring members, first transverse-axis connection means coupling said first and intermediate ring members, and second transverse-axis connection means coupling said second and intermediate ring members, said respective transverse-axis connection means providing orthogonally related axes of component displacement eccentric to the camera-mounting axis.

2. The system of claim 1, in which each of said transverse-axis connection means comprises aligned slots at diametrically opposite locations of one ring member and diametrically opposed pins on the adjacent ring member and slidable in said aligned slots.

3. The system of claim 1, in which said eccentric-offset adjustment means comprises separate adjusting elements operative to respectively adjust eccentric offset in each of two orthogonally related axes of eccentric offset.

4. The system of claim 1, in which each of said adjusting elements is a ring journalled for rotation on the camera-mounting axis of said adapter means.

5. In combination with an automatic-diaphragm photographic lens having a swing arm that is angularly positionable to reflect the instantaneous aperture setting of the lens, an adapter having a camera-mounting end for connection to a camera body on the camera axis and having a lens-mounting end for carrying the lens on a lens-mounting axis, said adapter including selectively movable means for effecting an eccentric-offset relation between said axes, and a multiple-element angle-of-swing transmission system for presenting at said camera-mounting end the instantaneous angular position of said swing arm; said transmission system including a first rotary member journalled for rotation on the lens-mounting axis of said adapter and including a motion-tracking member engaged to said swing arm, a second rotary member journalled for rotation on the camera-mounting axis of said adapter and including a drive element for engagement with camera-body exposure-control mechanism, and a floating rotary coupling member intermediate said members, said coupling member being coupled to said first rotary member with means limiting the same to a first axis of eccentric displacement, and said coupling member being coupled to said second rotary member with means limiting the same to a second axis of eccentric displacement that is orthogonal to said first axis of eccentric displacement.

* * * * *